May 6, 1924.
C. R. GABRIEL
1,492,561
WASHER OR SHIM
Filed Nov. 17, 1920
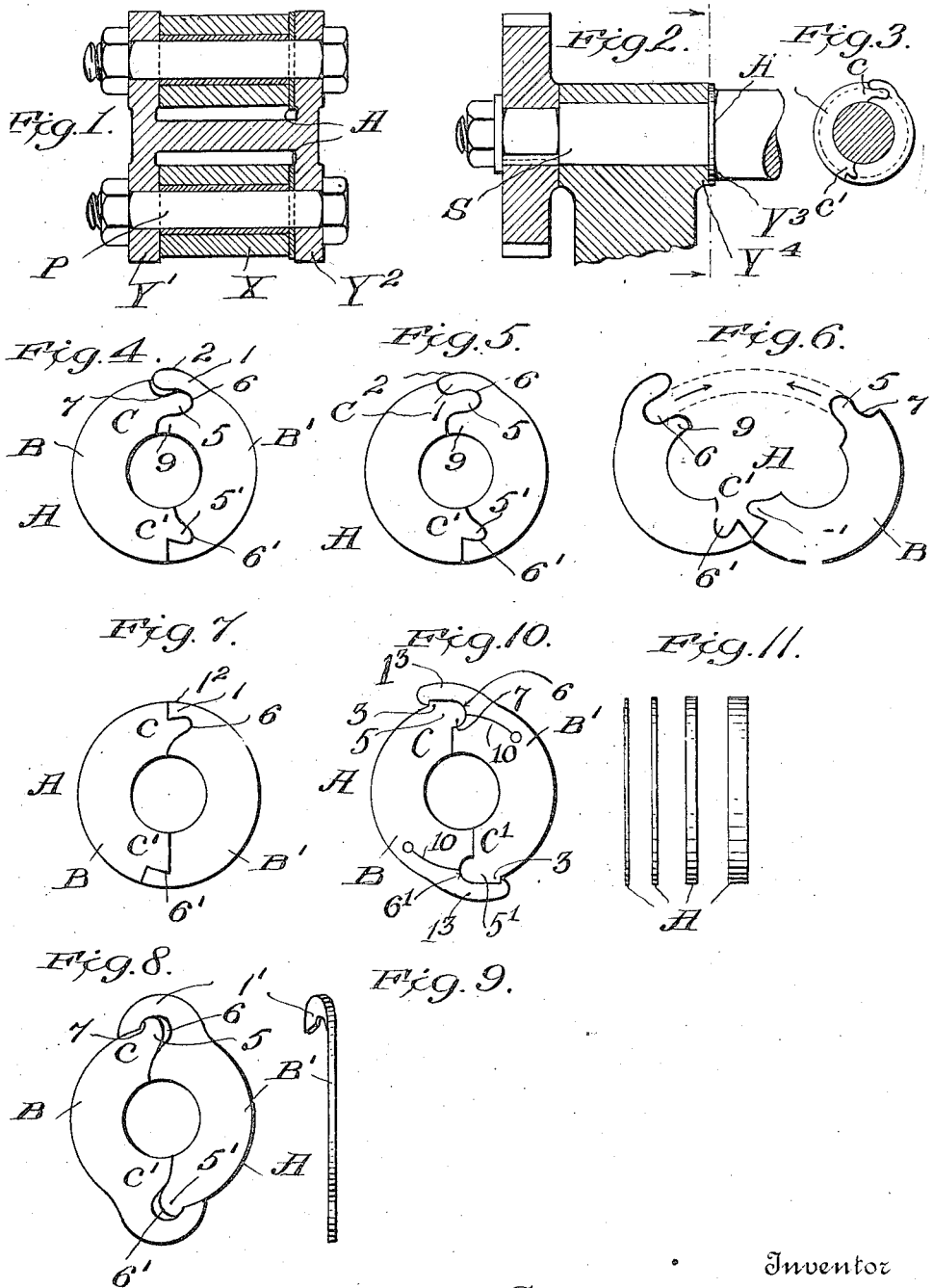
Inventor
Charles R. Gabriel,
By his Attorneys Patented May 6, 1924.

1,492,561

UNITED STATES PATENT OFFICE.

CHARLES R. GABRIEL, OF BROOKLYN, NEW YORK, ASSIGNOR TO SECTIONAL GAP WASHER CORPORATION, OF BROOKLYN, NEW YORK, A CORPORATION OF NEW YORK.

WASHER OR SHIM.

Application filed November 17, 1920. Serial No. 424,693.

*To all whom it may concern:*

Be it known that I, CHARLES R. GABRIEL, a citizen of the United States of America, residing in the borough of Brooklyn, county of Kings, in the city and State of New York, have invented certain new and useful Improvements in Washers or Shims, of which the following is a specification.

This invention relates to washers or shims, and aims to provide improvements therein.

The invention provides a washer or shim which can be placed in position on a shaft (and preferably also removed therefrom), between two parts, as, for example, between a shoulder on a shaft and a side of a bearing, or between an eye and a shackle in an automobile spring suspension, without removal or displacement of any of the parts on the shaft or pin, and which admits of manufacture in a variety of thicknesses, especially very little thickness (thin), and which provides a secure joint between the segments thereof. The device is, hence, very convenient for filling the space due to wear or other causes, which develops between the sides of two relatively rotatable parts on a shaft, to compensate for end play, and prevent rattling noises and vibration.

The invention further provides a device, of simple and effective construction, which may be readily and economically manufactured, and which may be applied, in a simple manner, and with the aid of a common and simple tool.

Other features and advantages of the invention will be set forth in connection with the accompanying description.

Several embodiments of the invention are illustrated in the accompanying drawings.

In said drawings:

Figure 1 is a sectional view of a shackle connection, forming part of an automobile spring suspension, and showing a washer, of the present invention, applied thereto.

Figure 2 is a sectional view of a part of a machine, showing the invention applied thereto.

Figure 3 is a cross-section of the parts shown in Figure 2, looking in the direction of the arrows.

Figure 4 is a face view of one embodiment of the invention.

Figure 5 is a view, similar to Figure 4, showing the interlocking parts in locked position.

Figure 6 is a view, showing the manner of connecting the parts of the embodiment of washer, shown in the preceding views, around a shaft.

Figure 7 is a face view of a second embodiment of the invention.

Figures 8 and 9 are, respectively, face and side views of a third embodiment of the invention.

Figure 10 is a face view of a fourth embodiment of the invention; and

Figure 11 is a side view of a number of washers, designed to illustrate the variety of thicknesses in which the washers are made.

Referring to said drawings, the washer (conveniently designated by the letter A) is made in a plurality of parts or segments (and most conveniently in two parts), B, B¹, and interlocking means are provided, preferably at the meeting surfaces at the two diametral sides of the washer, as indicated at C, C¹. One of the interlocking parts has an offset portion, as indicated at 1, Fig. 4, and 1', Figs. 8 and 9, which is adapted to permit the two segments or parts B, B¹, to be brought together in a space limited by the thickness of the metal or other material of which the washer is formed, thus enabling a washer, of a thickness corresponding to the play, due to wear between two parts, on a shaft or the like, to be brought together in a radial direction, and interlocked, without necessitating any displacement or removal of parts attached to said shaft, or the like. For example, referring to Fig. 1, if the wear between the eye X, and two shoulders Y¹,Y², of a shackle, or between a shoulder Y³ on a shaft, and the side Y⁴ of a bearing formed in a part of a machine frame, corresponds to the width of the washer A there shown, a washer of such width, of my invention, may be inserted in the space between the part X and the part Y², Fig. 1, or in the space between the shoulders Y³ and Y⁴, Fig. 2, for example, without requiring any displacement or removal of either the pin P or shaft S, thus rendering the matter of taking up the wear and stopping rattling noises simply a matter of applying a washer or shim A, of the proper thickness. The width of the bodies of the parts B, B¹, between the inner and outer peripheries, is usually such that they are substantially rigid in the direction of such width.

In Fig. 4, the offset portion 1 is offset in a radial direction, and, in the construction shown in Figs. 8 and 9, the offset portion 1' is offset in a lateral direction, and, where the offset is in a lateral direction, said offset portion should be at a sufficient distance from the center of the washer to enable it to be turned to one side, over shoulders or collars of usual diameter, and washers of special size could be made to take care of shoulders or collars of unusual diameter. With a radially offset portion, as designated by the numeral 1, in Fig. 4, it is convenient to form it with a projecting portion 2, designated to project beyond collars or shoulders of usual diameter, to serve as an indication as to the location of the interlocking means, and also to serve to receive a blow from a hammer, or other striking instrument for forcing the offset portion into locking position. In removing the washer A, the projecting portion 2 may be grasped by pincers, and the portion 1 bent up to release the lock of the interlocking members, and, in the construction shown in Figs. 8 and 9, the portion 1' may be released simply by turning it outward to one side, as shown in Fig. 9.

The offset portion, however, may be made so that no portion projects beyond the circumference of the washer, when the offset portion is in locking position, as indicated at 1², Fig. 7.

Moreover, the offset portion may be of such a character that it is only offset in the act of joining the segments of the washer. For example, as shown in Fig. 10, the washer may be made in such manner that the offset portion 1³ may spring or yield slightly in passing over a shoulder 3, forming part of the interlocking means C or C¹, and, after passing over the shoulder 3, reflex or "snap" behind said shoulder, and hold the segments locked together. In order that the said offset portion 1³ may readily spring or yield, the washer may be slit, as indicated at 10.

In order that the interlocking means may act to prevent the parts from moving out of interlocked position, in a diametral direction, as, for example, when the shaft becomes worn, and, consequently, becomes of a considerably lesser diameter than the hole in the washer, the interlocking means C, C¹, are preferably formed in the manner of a tenon and recess, as indicated, for example, in the several forms illustrated, the tenons being designated by the numerals 5, 5¹, and the recesses by the numerals 6, 6¹. Moreover, one or more of the tenons are preferably undercut or formed in the manner of a dovetail, as indicated by the numeral 7, thus preventing separation, in a radial direction, of the segments B, B¹, when the offset portion 1, 1¹, 1², 1³, is in locking position. The tenon and the material around the recess are of the same thickness as the washer.

The portion 9 of the segment of the washer having the recessed part of the interlocking means therein is preferably extended forwardly somewhat, under the tenon, and under the offset portion, as shown in Figs. 4 and 6, for example, the purpose of which construction is that the part 9 shall sustain, in a substantially direct manner, the force of the blow or pressure applied upon the offset portion, to bend it into locking position, where such force or pressure is applied in a diametral direction, as would ordinarily be the case in applying the washer embodied in Figs. 4 and 6, for example.

The form of the interlocking means C, C¹, are conveniently such that the sections B, B¹, of the washer are brought together by a turning movement on a center at one side of the washer, in the manner of the closing of a pair of jaws, as is illustrated in Fig. 6. The dotted lines illustrate the path of the interlocking parts, and, when these parts move substantially along the lines indicated, the interlocking parts may move, without obstruction, into interlocked position, and the interlocking parts may be locked by a suitable movement of the offset portion of the interlocking means. Of course, it will be understood that the method of uniting the parts is only one of those which may be adopted. For example, in Figs. 8 and 9, by offsetting the offset portions 1¹ at the two sides of the washer, the two sections may be moved directly, that is, radially, together. Or, if the offset portion 1¹, at only one side, be bent to one side, the two parts may be united by a turning movement, in the manner of the closing of a pair of jaws, as described with reference to the parts shown in Fig. 6.

In the claims, the term offset is understood to define a construction wherein the interlocking portion is temporarily offset in the act of uniting the sections under spring action, as well as a construction wherein the interlocking portion is offset prior to parts of the washer being joined, and thereafter closed or bent to a locked position.

The inventive ideas herein set forth are capable of expression in a great variety of mechanical constructions, and the embodiments herein specifically illustrated and described are not to be understood as limiting the variety of the embodiments in which the invention may be included.

What is claimed is:—

1. A shim or washer, adapted to be applied radially to a shaft, without displacement of parts, within a space aproximately equal to its own thickness, for compensating for wear on the sides of pivotal or rotary parts, said washer comprising a plurality of segments having interlocking parts, said segments having a thickness substantially equal to the width of the space in which the washer is to fit, and being adapted to move together to interlocking position within a space substantially equal to the thickness thereof, the bodies of said segments being of such width as to be substantially rigid in the direction of such width, said interlocking parts comprising an off-set marginal portion, adapted to be moved into a locking position with its complementary part by a tool or manipulation applied at an externally accessible part of said washer, said interlocking parts being of a thickness corresponding to that of the segments.

2. A shim or washer, adapted to be applied radially to a shaft, without displacement of parts, within a space approximately equal to its own thickness, for compensating for wear on the sides of pivotal or rotary parts, said washer comprising a plurality of segments having interlocking parts, said segments having a thickness substantially equal to the width of the space in which the washer is to fit, and being adapted to move together to interlocking position within a space substantially equal to the thickness thereof, the bodies of said segments being of such width as to be substantially rigid in the direction of such width, said interlocking parts having an offset part, adapted to be moved into locking position with its complementary part, said interlocking parts being of a thickness corresponding to that of the segments, and overlying one another in locked position, in a radial direction.

3. A shim or washer, adapted to be applied radially to a shaft, without displacement of parts, within a space approximately equal to its own thickness, for compensating for wear on the sides of pivotal or rotary parts, said washer comprising a plurality of segments having interlocking parts, said segments having a thickness substantially equal to the width of the space in which the washer is to fit, and being adapted to move together to interlocking position within a space substantially equal to the thickness thereof, the bodies of said segments being of such width as to be substantially rigid in the direction of such width, said interlocking parts having a diametrally off-set part, adapted to be moved into locking position with its complementary part, said interlocking parts being of a thickness corresponding to that of the segments, and overlying one another in locked position, in a radial direction.

4. A shim or washer, adapted to be applied radially to a shaft, without displacement of parts, within a space approximately equal to its own thickness, for compensating for wear on the sides of pivotal or rotary parts, said washer comprising a plurality of segments having interlocking parts, said segments having a thickness substantially equal to the width of the space in which the washer is to fit, and being adapted to move together to interlocking position within a space substantially equal to the thickness thereof, the bodies of said segments being of such width as to be substantially rigid in the direction of such width, said interlocking parts having an off-set part, adapted to be moved into locking position with its complementary part, said interlocking parts being of a thickness corresponding to that of the segments, and overlying one another in locked position, in a radial direction, said off-set portion projecting beyond the perimeter of said washer, whereby to be readily located and manipulated.

5. A shim or washer, adapted to be applied radially to a shaft, without displacement of parts, within a space approximately equal to its own thickness, for compensating for wear on the sides of pivotal or rotary parts, said washer comprising a plurality of segments having interlocking parts, said segments having a thickness substantially equal to the width of the space in which the washer is to fit, and being adapted to move together to interlocking position within a space substantially equal to the thickness thereof, the bodies of said segments being of such width as to be substantially rigid in the direction of such width, said interlocking parts having an off-set part, adapted to be moved into locking position with its complementary part, said interlocking parts being of a thickness corresponding to that of the segments, and overlying one another in locked position, in a radial direction, said interlocking parts being in the form of a tenon and recess.

6. A shim or washer, adapted to be applied radially to a shaft, without displacement of parts, within a space approximately equal to its own thickness, for compensating for wear on the sides of pivotal or rotary parts, said washer comprising a plurality of segments having interlocking parts, said segments having a thickness substantially equal to the width of the space in which the washer is to fit, and being adapted to move together to interlocking position within a space substantially equal to the thickness thereof, the bodies of said segments being of such width as to be substantially rigid in the direction of such width, said interlocking parts having an off-set part, adapted to be moved into locking position with its complementary part, said interlocking parts being of a thickness corresponding to that of the segments, and overlying one another in locked position, in a radial direction, said interlocking parts being in the form of a tenon and recess, said tenon being on one segment and said recess being in another, and said recessed segment having portions on the inner and outer sides of said recess, said portion on the inner side of said recess being adapted to sustain, in a substantially direct manner, a blow upon the portion of said segment on the outer side of said recess.

7. A shim or washer, adapted to be applied radially to a shaft, without displacement of parts, within a space approximately equal to its own thickness, for compensating for wear on the sides of pivotal or rotary parts, said washer comprising a plurality of segments having interlocking parts, said segments having a thickness substantially equal to the width of the space in which the washer is to fit, and being adapted to move together to interlocking position within a space substantially equal to the thickness thereof, the bodies of said segments being of such width as to be substantially rigid in the direction of such width, said interlocking parts having an off-set part, adapted to be moved into locking position with its complementary part, said interlocking parts being of a thickness corresponding to that of the segments, and overlying one another in locked position, in a radial direction, said interlocking parts being in the form of a tenon and recess, said tenon having an undercut portion, whereby said segment may be locked in the manner of parts of a dove-tail joint.

8. A shim or washer in two parts, the bodies of said parts being of such width as to be substantially rigid, in the direction of such width, each adapted to be applied radially to a shaft within a space equal to its own thickness, said parts having reciprocally engaging portions adapted to interlock within the facial planes of the washer to fasten the parts together, their engaging faces being of substantially the full thickness of the washer, an engaging portion of one part being bendable to interlock with an engaging portion of the other part.

9. A shim or washer in two parts, the bodies of said parts being of such width as to be substantially rigid, in the direction of such width, each adapted to be applied radially to a shaft within a space equal to its own thickness, said parts having reciprocally engaging portions adapted to interlock within the facial planes of the washer to fasten the parts together, their engaging faces being of substantially the full thickness of the washer, one part having a projecting portion protruding beyond the normal outline of the washer, and movable to accomplish the engagement of said faces.

10. A shim or washer in two parts, the bodies of said parts being of such width as to be substantially rigid, in the direction of such width, each adapted to be applied radially to a shaft within a space equal to its own thickness, said parts having reciprocally engaging portions adapted to interlock within the facial planes of the washer to fasten the parts together, their engaging faces being of substantially the full thickness of the washer, one part having a projecting portion protruding beyond the normal outline of the washer, and bendable to accomplish the engagement of said faces.

11. A shim or washer in two parts, the bodies of said parts being of such width as to be substantially rigid in the direction of such width, each adapted to be applied radially to a shaft within a space equal to its own thickness, said parts having reciprocally engaging portions adapted to interlock within the facial planes of the washer to fasten the parts together, their engaging faces being of substantially the full thickness of the washer, an engaging portion of one part being bendable to interlock with an engaging portion on the other part, and other reciprocally engaging portions between said parts, of substantially the full thickness of said washer.

12. A shim or washer in two parts, the bodies of said parts being of such width as to be substantially rigid in the direction of such width, each adapted to be applied radially to a shaft within a space equal to its own thickness, said parts having reciprocally engaging portions adapted to interlock within the facial planes of the washer to fasten the parts together, their engaging faces being of substantially the full thickness of the washer, an engaging portion of one part being bendable to interlock with an engaging portion on the other part, and other reciprocally engaging portions between said parts, of substantially the full thickness of said washer, said last-named engaging portions being adapted to interengage when said washer parts are brought together in the manner of the closing of a pair of jaws.

13. A shim or washer, adapted to be applied radially to a shaft, without displacement of parts, within a space approximately equal to its own thickness, for compensating for wear on the sides of pivotal or rotary parts, said washer comprising two segments having interlocking parts, said segments having a thickness substantially equal to the width of the space in which the washer is to fit, and being adapted to move together to interlocking position, within a space substantially equal to the thickness thereof, the bodies of said segments being of such width as to be substantially rigid in the direction of such width, said interlocking parts having an off-set part, adapted to be moved into locking position with its complementary part, said interlocking parts being of a thickness corresponding to that of the segments, and overlying one another in locked position, in a radial direction, said interlocking parts being in the form of a tenon and recess, and other interlocking parts between said segments of substantially the full thickness of said washer.

14. A shim or washer, adapted to be applied radially to a shaft, without displacement of parts, within a space approximately equal to its own thickness, for compensating for wear on the sides of pivotal or rotary parts, said washer comprising two segments having interlocking parts, said segments having a thickness substantially equal to the width of the space in which the washer is to fit, and being adapted to move together to interlocking position, within a space substantially equal to the thickness thereof, the bodies of said segments being of such width as to be substantially rigid in the direction of such width, said interlocking parts having an off-set part, adapted to be moved into locking position with its complementary part, said interlocking parts being of a thickness corresponding to that of the segments, and overlying one another in locked position, in a radial direction, said interlocking parts being in the form of a tenon and recess, and other interlocking parts between said segments of substantially the full thickness of said washer, said last-named interlocking parts being adapted to interengage when said segments are brought together in the manner of the closing of a pair of jaws.

In witness whereof, I have hereunto signed my name.

CHARLES R. GABRIEL.